(12) United States Patent
Broustis et al.

(10) Patent No.: US 8,769,259 B2
(45) Date of Patent: Jul. 1, 2014

(54) METHODS AND APPARATUSES FOR SECURE INFORMATION SHARING IN SOCIAL NETWORKS USING RANDOMLY-GENERATED KEYS

(75) Inventors: Ioannis Broustis, Millburn, NJ (US); Violeta Cakulev, Millburn, NJ (US); Ganapathy Subramanian Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 215 days.

(21) Appl. No.: 13/345,241

(22) Filed: Jan. 6, 2012

(65) Prior Publication Data
US 2013/0179679 A1 Jul. 11, 2013

(51) Int. Cl.
*H04L 29/06* (2006.01)

(52) U.S. Cl.
USPC .......................................................... 713/152

(58) Field of Classification Search
USPC .............................................. 713/152; 726/3
See application file for complete search history.

(56) References Cited

U.S. PATENT DOCUMENTS

| 2007/0055880 A1* | 3/2007 | Lauter et al. ................... 713/171 |
| 2008/0260147 A1* | 10/2008 | Shin et al. ........................ 380/46 |
| 2013/0173712 A1* | 7/2013 | Monjas Llorente et al. .. 709/204 |

OTHER PUBLICATIONS

Baden R et al: "Persona: an online social network with User-defined privacy",Computer Communication Review, ACM, New York, NY, US, vol. 39, No. 4, Oct. 1, 2009, pp. 135-146, XP002672631, ISSN: 0146-4833 the whole document.
Filipe Beato et al: "Enforcing Access Control in Social Network Sites", Jan. 1, 2009, XP055057904, Belgium Retrieved from Internet: URL:https://www.cosic.esat.kuleuven.be/publications/article-1240.pdf [retried on Mar. 26, 2013] the whole document.
Ben Dodson et al: "Musubi: disintermediated interactive social fees fo mobile devices", Proceedsing of the 21st international conference on WordWide Web, WWW '12, Apr. 20, 2012, pp. 211-220, XP055057892, New York, New York, USA DOI: 10.1145/2187836. 2187866; ISBN:978-1-45-031220-5, Retrieved from the Internet: URL: http://delivery.acm.org/10.1145.2190000/2187866/p211-dodson.pdf?ip=145.64.134.247&acc=ACTIVESERVICE &CFID=303104287&CFTOKEN=60139874&acm_= 1364311001_226133aab614201de3adf)b8198ce180.

* cited by examiner

*Primary Examiner* — Kambiz Zand
*Assistant Examiner* — Aubrey Wyszynski
(74) *Attorney, Agent, or Firm* — Ryan, Mason & Lewis, LLP (57) ABSTRACT

There can be problems with the security of social networking communications. For example, there may be occasions when a number of friends wish to communicate securely through a social network infrastructure, such that non-trusted $3^{rd}$-party entities, such as a Social Network Operator or host that provides the application infrastructure, does not overhear the communication. In response to the above problems, embodiments presented propose a set of innovative, lightweight solutions, considering that in certain scenarios the Social Network Operator may not be a trusted entity. Embodiments of the present invention are directed to methods and apparatuses for secure information sharing in social networks using random keys.

20 Claims, 4 Drawing Sheets

METHODS AND APPARATUSES FOR SECURE INFORMATION SHARING IN SOCIAL NETWORKS USING RANDOMLY-GENERATED KEYS

CROSS-REFERENCE

This application is related to U.S. patent application Ser. No. 13/345,241 filed Jan. 6, 2012, titled Methods and Apparatuses for Maintaining Security Between Groups of Users in a Social Network, by Ioannis Broustis, Violeta Cakulev, and Ganapathy Sundaram.

FIELD OF THE INVENTION

Embodiments of the present invention are directed to methods and apparatuses for secure information sharing in social networks using randomly-chosen keys. More specifically, multiple methods of securely sharing data using a randomly selected key between a data initiating user and a set of authorized users (e.g., friends) are described.

BACKGROUND

This section introduces aspects that may be helpful in facilitating a better understanding of the invention. Accordingly, the statements of this section are to be read in this light and are not to be understood as admissions about what is in the prior art or what is not in the prior art.

During the last few years, social networking has become one of the main ways of communicating between people. Social networking and/or social networks are intended to be interpreted broadly and to be defined as a social structure made up of individuals (or organizations) called for example, "nodes", which can be tied (e.g., connected) by one or more specific types of interdependencies, such as, friendship, kinship, common interests, financial exchanges, dislikes, likes, relationships of beliefs, knowledge, prestige, etc. Web-based social networking services, for example, Facebook, Twitter, MySpace, Bebo, LinkedIn, Xing, etc., make it possible to connect people who share interests and activities across political, economic, and geographic borders. Social networks (hereinafter including web-based social networks) provide a new way for individuals to communicate digitally.

However, the vast majority of social networking users today feel insecure, knowing that the information that they share over a social network can be misused by social network operators, for example, cloud operators acting as social network hosts. This is especially the case with enterprise users and customers, which can share confidential, high-value enterprise information using social networks that are hosted in the cloud, i.e., beyond the authority of enterprise IT departments.

SUMMARY

The aspects described above and other aspects of the subject matter described herein are illustrated by way of example and not limited in the accompanying figures in which like reference numerals indicate similar elements.

As identified above, there are problems with the security of social networking communications. For example, there may be occasions when a number of friends wish to communicate securely through a social network infrastructure, such that non-trusted $3^{rd}$-party entities, such as a Social Network Operator or host that provides the application infrastructure, does not overhear the communication. In response to the above problems, embodiments presented propose a set of innovative, lightweight solutions, considering that in certain scenarios the Social Network Operator may not be a trusted entity.

Embodiments include methods for secure information sharing in a social network. In embodiments, methods include sending an access token, by a user of the social network, to a storage location of the social network, to obtain at least one message including data intended to be shared with the user of the social network, wherein the access token authorizes access to the at least one message by a resource owner of the at least one message. The methods also include receiving the at least one message by a user and extracting a first ciphertext $C_i$ and a second ciphertext $C_{D1}$ from the at least one message by a processor. The method can also include decrypting the first ciphertext $C_i$ with a second key to obtain a random key $K_R$ and decrypting the second ciphertext $C_{D1}$ using the random key $K_R$ to obtain the data $D_1$ intended to be shared by a processor.

In other embodiments, the second key is a private key of the user corresponding to a known public key of the user. In addition, in other embodiments, the at least one message can have the following structure, $m_1 = C_{D1} \| \{U_2, C_2\} \| \ldots \| \{U_M, C_M\}$, wherein $C_{D1}$ is the second ciphertext of $D_1$ encrypted by $K_R$, and $\{U_2, C_2\} \| \ldots \| \{U_M, C_M\}$ is the user identified concatenated first ciphertext $C_i$ for users 2 to M, where each first ciphertext is the random key $K_R$ encrypted with the public key of the identified user.

In alternative embodiments, the second key can be a group public key. The group public key can be obtained from a key generation function entity. In yet other embodiments, the second key can be a shared commonly derived key. The shared commonly derived key can be based on a secret random number and a commonly agreed to point on an elliptic curve.

In other embodiments, the user can receive notification that at least one message including data intended to be shared with the user of the social network is present at the social network. Alternatively, other embodiments can include sending update requests as to whether there is at least one message including data intended to be shared with the user of the social network present at the social network and receiving confirmation that there is at least one message including data intended to be shared with the user of the social network present at the social network.

In other embodiments, the access token can be an OAuth access token and/or the method can include validating the access token prior to receiving the at least one message. In embodiments, the methods can also include validating the integrity of the at least one message by using a known public key of the resource owner.

Similar embodiments include methods including selecting, by a user of the social network, a random key $K_R$ and encrypting data intended to be shared with a set of users of the social network with the random key $K_R$ to create a first ciphertext $C_{D1}$, by a processor. The methods can further include, encrypting the random key $K_R$ with a second key to create a second ciphertext $C_i$, by a processor, creating a message including both the first and second ciphertexts, by a processor, and sending the created message to a storage location of the social network. As discussed above, the second key can be a public key of a user of the set of users, or a group public key, or a shared commonly derived key based on a secret random number and a commonly agreed to point on an elliptic curve.

Other embodiments are directed to apparatuses including memories and processors. For example, in one embodiment, the apparatus can include a memory and at least one processor coupled to the memory and configured to send an access token, by a user of the social network, to a storage location of the social network, to obtain at least one message including data intended to be shared with the user of the social network, wherein the access token authorizes access to the at least one message by a resource owner of the at least one message. The processor can also be configured to receive the at least one message and to extract a first ciphertext $C_i$ and a second ciphertext $C_{D1}$ from the at least one message. The apparatus further can decrypt the first ciphertext $C_i$ to obtain a random key $K_R$ using a second key, and decrypt the second ciphertext $C_{D1}$ using the random key $K_R$ to obtain the data $D_1$ intended to be shared.

In another embodiment, the apparatus includes a memory and at least one processor coupled to the memory and configured to select, by a user of the social network, a random key $K_R$ and encrypt data intended to be shared with a set of users of the social network with the random key $K_R$ to create a first ciphertext $C_{D1}$. The apparatus can also be configured to encrypt the random key $K_R$ with a second key to create a second ciphertext $C_i$, to create a message including both the first and second ciphertexts, and to send the created message to a storage location of the social network.

Finally, embodiments are directed to systems for secure information sharing in social networks. Embodiments include, a first social network user configured to encrypt data to be shared between a set of social network users, using a random key, to generate a set of ciphertexts by encrypting the random key with a second key, to form a message including the encrypted data and the generated set of ciphertexts, and to send the formed message to a social network host. The system can also include, the social network host configured to receive and store the formed message, and send the formed message to at least one of the set of access authorized social network users. Finally, the system can include a set of social network users, each configured to receive the formed message, to extract at least one ciphertext from the formed message, to decrypt the at least one ciphertext using a corresponding key to the second key to obtain the random key, and to decrypt data from the formed message using the decrypted random key.

DESCRIPTION OF THE EMBODIMENTS

The term "key" as used herein is generally defined as an input to a cryptographic protocol or method, for purposes such as, but not limited to, entity authentication, privacy, message integrity, etc. The term "friend" as used herein is generally defined as a user of a social network that is part of a group of users that have a common attribute and that have agreed to allow access to at least a part of each other's information on the social network.

A social networking service is an online service, platform, or site that focuses on building and reflecting of social networks or social relations among people, who, for example, share interests and/or activities. A social network service essentially consists of a representation of each user (often a profile), his/her social links, and a variety of additional services. Most social network services are web based and provide means for users to interact over the Internet, such as e-mail, file-sharing and instant messaging. While the vast majority of social networks are open to the public, allowing practically anyone to create an account and start socializing through the network infrastructure, social networking has merely been one of the de-facto tools for intra-enterprise communications, allowing e.g. employees within an enterprise to communicate and exchange ideas and views.

Typically social network applications are hosted by web hosting services which specifically host the user creation of web-based social networking services, alongside related applications. Such services are also known as vertical social networks due to the creation of services that in many cases cater to specific user interests. Due to the large number of users that typically associate with popular social networks, hosting services most commonly reside in the cloud, i.e., in scalable and powerful data centers. Such data centers in many cases are operated under the authority of entities that are not known to the end-user and as a consequence, there may be no inherent trust between the end-user and the social network operator (SNO) or host. This is especially the case with enterprise social networks, where employees exchange enterprise confidential information through the social network, such that the exchanged information is visible to the social network operator. Hence, given that communication among users via social network infrastructures involves sharing of private and/or confidential information, it is apparent that users are not secured against non-trusted social network hosts.

Figure 1:
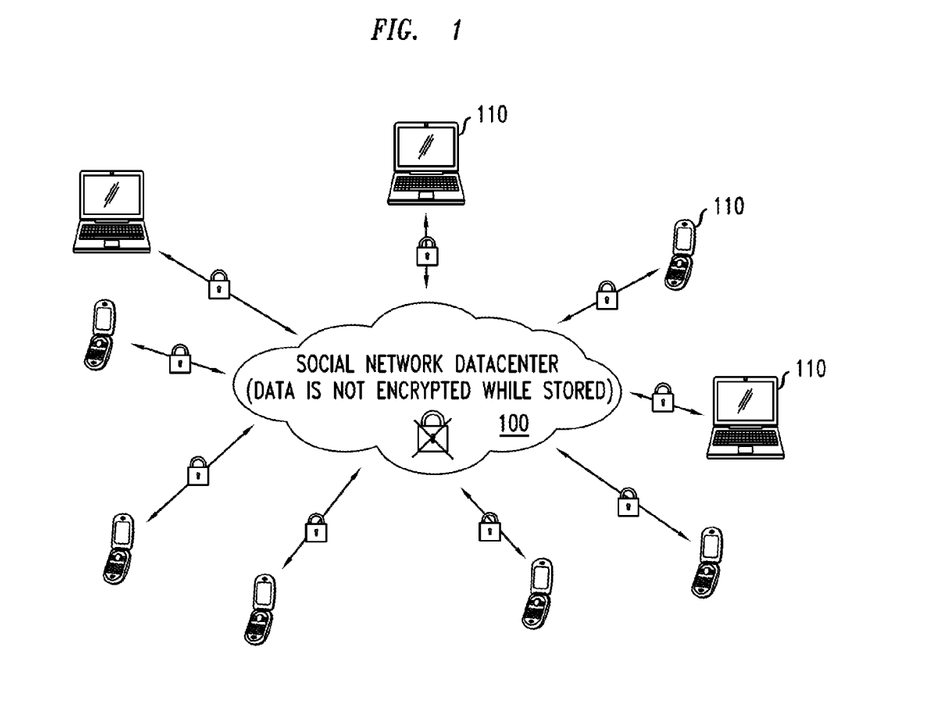
FIG. 1 shows a social network system and a number of users, according to embodiments.

In FIG. 1, it is shown that the social network host/operator 100 typically provides secure interfaces with the end user 110 and with this, user information and data is adequately secured on the communication link with the operator. However, such data is not encrypted while residing within the social infrastructure 100, since it is decrypted as soon as it reaches the operator 100; as a consequence the social network operator 100 can still obtain the data. This poses a significant threat to social networking users 110, especially for the case of enterprise environments; confidential enterprise data may be easily confiscated while stored within the operator's 100 infrastructure. This can result in unprecedented financial costs to enterprises and can further tremendously affect the economics of the Internet.

Note also that most popular social networks may provide some level of protection of user data against unauthorized access from certain users. More specifically, networks provide some means of user authorization with which, a user X is allowed to access user Y's data only if the latter has provided authorization to do so. For example, one of the most popular authorization frameworks that is used in this context is OAuth (Open Authorization). See, for example, E. H. Lahav, Ed, D. Recordon, D. Hardt. The OAuth 2.0 Protocol. draft-ietf-oauth-v2-07, http://tools.ietf.org/html/draft-oetf-oauth-v2-07; and E. H. Lahav, Ed. The OAuth 1.0 Protocol. 1ETF RFC 5849, http://tools.ietf.org/html/rfc5849; both of which are herein incorporated by reference in their entireties. Other examples of authorization frameworks can include Authentication, Authorization, and Accounting (AAA) protocols and Lightweight Development Access Protocol (LDAP), and are not intended to be limited.

OAuth provides a method for clients to access server resources on behalf of a resource owner (such as a different client or an end-user). More generally, it provides a process for resource owners to authorize third-party access to their server resources without sharing their credentials (typically, a username/password pair), using user-agent redirections.

For example, a user has a message to share and sends the message to the social network. The user then identifies other social network users, e.g., A and B, who are friends of the user and who the user wants to share the message with. In order for A and B to obtain the message without using the user's credentials (e.g., username and password), A and B instead each obtain an access token from the user (this process is well known by those of ordinary skill in the art and as documented in the above cited documents) that grants access to A and B to the message. In this scenario, the user is the resource owner and A and B are the third parties. To obtain the message, A and B each supply their access token to the social network and upon validation of the access token, the social network will supply A and B with the message.

However, OAuth still allows the social network operator to access and obtain the end-user's data, since OAuth does not provide any means of end-to-end encryption of data among users; it only provides a means of authorizing whether a specific user is allowed to access another user's data. OAuth does not protect the user's data from unauthorized access by the social network operator, since it inherently assumes that the latter is trusted by the user.

As discussed above, consider a social network consisting of N users $\underline{U}_N = (U_1, U_2, \ldots, U_N)$. The network is operated by a Social Network Operator (SNO), which provides OAuth services (for example). Each user $U_i$ wishes to share information only with friends, where a friend is considered to be any user $Uj \in \underline{U}_N$ that is affiliated with $U_i$ and is authorized to receive $U_i$'s information through OAuth.

Information is typically shared by utilizing a Resource-based Service infrastructure, RS, which can be potentially owned by SNO and which: (a) can provide storage and information dissemination/availability functions, (b) can execute OAuth (Open Authorization) protocol functions (or other authentication and authorization functions), through which users are authorized to access information owned by other (friend) users, and (c) in some cases the SNO can optionally play the role of and/or collaborate with a 3$^{rd}$ party Key Generation Function (KGF), which generate public key related security credentials (e.g. IBE private keys) for each of the N users, as well as for groups of such users.

A user may be online or offline at any instance of time; in other words, not all users are necessarily online at the same time. Given this set-up, a problem that addressed is: "How can the information shared through OAuth by user $U_i$ with friend users, be secured?" In other words, how can U, make sure that the shared information is stored securely, obtained only by an authorized set of (friend) users, and (if needed) how can those friends verify that the received information is indeed provided by $U_i$?

Throughout the rest of this discussion it is assumed that user U, wishes to share a piece of information data $D_i$ with M−1 specific users (friends), using OAuth as the means of authorization. Without loss of generality, it is assumed that user $U_1$ wants to share $D_1$ with users $U_2, U_3, \ldots, U_M$, such that information is shared among M≤N users. All N users are assumed to have a pair of keys (a private and a public key), which correspond to a specific user identity (e.g., IBE security credentials). User $U_i$'s private key $K_{PRi}$ is kept secret by $U_i$, while the corresponding public key $K_{PUBi}$ is known or made available to all N users. It is also assumed that for storage of information shared by $U_i$, SNO allocates resource storage/container $r_i$. Depending on the social network implementation, $r_i$ may be a single resource or multiple mirrored resources, each owned by a different user. Although user authorization operations for accessing resources are handled by OAuth, it is assumed that users may not always trust SNO with regards to how safely the shared information is stored in RS. Therefore one problem addressed is how a user $U_i$ securely stores and later shares the stored information with his friends. All solutions assume the stored information is encrypted and that it can be obtained and decrypted by an authorized set of (friend) users and possibly SNO itself.

In what follows we provide embodiments for the case where IBE private and public keys are used within the context of Identity Based Authenticated Key Exchange (IBAKE). See, for example, V. Cakulev and G. Sundaram. MIKEY-IBAKE: Identity-Based Authenticated Key Exchange (IBAKE) Mode of Key Distribution in Multimedia Internet KEYing (MIKEY). IETF Network Working Group RFC 6267, June 2011, which is herein incorporated by reference in its entirety.

Other public key methods, such as RSA along with certificates may alternatively be employed. See, for example, C. Adams and S. Lloyd. Understanding PKI: Concepts, Standards, and Deployment Considerations. Addison-Wesley Professional; 2 edition, ISBN-10: 0672323915. 2002, which is herein incorporated by reference in its entirety.

For purposes of notation as used below, E(k, A) denotes that information A is encrypted with the key k, and s||t denotes concatenation of the strings s and t.

Prior to an explanation of illustrative embodiments of secure key management techniques of the embodiments, general principles of IBE and IBAKE are provided.

Identity Based Encryption

An Identity Based Encryption (IBE) protocol was presented by Boneh and Franklin, see Dan Boneh, Matthew K. Franklin, "Identity-Based Encryption from the Weil Pairing" Advances in Cryptology—Proceedings of CRYPTO 2001 (2001), the disclosure of which is incorporated by reference herein in its entirety. This asymmetric cryptographic encryption protocol allows participants to use an 'identity' (example: email-id, or domain name) as the public key and eliminates the need for large scale public key infrastructure which is often associated with public key encryption methods such as RSA (Rivest, Shamir and Adleman). Boneh and Franklin's approach to the problem uses bilinear maps on an elliptic curve over a finite field, and relies on the bilinear decisional Diffie-Hellman problem.

IBE involves the following mathematical tools and parameters:

Let E be an elliptic curve over a finite field F, and let P be a point of large prime order.

Let e: E×E→G be a bi-linear map on E. The typical example is the Weil pairing, and hence G will be the group of n-th roots of unity where n is a function of the number of points on E over F.

Let s be a non-zero positive integer and be a secret stored in a Key Generation Function (KGF). This is a system-wide secret and not revealed outside the KGF.

Let $P_{pub}=sP$ be the public key of the system that is known to all participants. Recall sP denotes a point in E, since E is a group.

Let $H_1$ be a known hash function that takes a string and assigns it to a point on the elliptic curve, i.e., $H_1(A)=Q_A$ on E, where A is usually the identity, and is also the public key of A.

Let $d_A=sQ_A$ be the private key computed by the KGF and delivered only to A.

Let $H_2$ be a known hash function that takes an element of G and assigns it to a string.

Let m be a message that has to be encrypted and sent to A. The encryption function described by Boneh and Franklin is as follows:

Let $g_A = e(Q_A, P_{pub})$, and let r be a random number.

Encryption$_A$(m)=(rP, m xor $H_2(g_A^r)$); in other words the encryption output of m has two coordinates u and v where u=rP and v=m xor $H_2(g_A^r)$. Note that "xor" refers to the exclusive OR logic function.

In order to decrypt (u,v), A recovers m using the following formula:

$$m = v\ xor\ H_2 e(d_A, u)). \qquad (1)$$

The proof of the formula is a straight forward exercise in bilinear maps, and the fact A has the secret $d_A$ (private key known only to A but not other participants). Also observe that the KGF, which computed $d_A$ in the first place, can also decrypt the message resulting in the KGF being a de-facto key escrow server.

Identity Based Authenticated Key Exchange

Identity Based Authenticated Key Exchange (IBAKE) is described in the U.S. patent application identified by Ser. No. 12/372,242, filed on Feb. 17, 2009, the disclosure of which is incorporated by reference herein in its entirety. The IBAKE protocol allows devices to mutually authenticate each other, and derive a key that provides perfect forwards and backwards secrecy.

In the IBAKE embodiment described here, the basic set up for this protocol involves the mathematical constructs and parameters discussed above. Recall that this protocol is asymmetric but does not require any PKI support; instead the protocol employs an offline server which serves as a Key Generation Function. The details of the protocol are outlined below:

Suppose A, B are the two entities (or parties, where A represents a computer system of a first party and B represents a computer system of a second party) that are attempting to authenticate and agree on a key.

We will use A and B to represent their corresponding identities, which by definition also represent their public keys.

Let $H_1(A) = Q_A$ and $H_1(B) = Q_B$ be the respective points on the elliptic curve corresponding to the public keys. In effect, one could refer to $Q_A$ and $Q_B$ as the public keys as well, since there is a one-to-one correspondence between the identities and the points on the curve obtained by applying $H_1$.

Let x be a random number chosen by A, and let y be a random number chosen by B.

The protocol exchanges between A and B comprises of the following steps:

A computes xP (i.e., P added to itself x times as a point on E' (which may or may not be the same as E), using the addition law on E') encrypts it using B's public key, and transmits it to B in a first step. In this step, encryption refers to identity based encryption described above.

Upon receipt of the encrypted message, B decrypts the message and obtains xP. Subsequently B computes yP, and encrypts the pair {xP, yP} using A's public key and then transmits it to A in a second step.

Upon receipt of this message, A decrypts the message and obtains yP. Subsequently, A encrypts yP using B's public key and sends it back to B in a third step.

Following this, both A and B compute xyP as the session key.

Observe that A chose x randomly, and received yP in the second step of the protocol exchange. This allows A to compute xyP by adding yP to itself x times. Conversely, B chose y randomly, and received xP in the first step of the protocol exchange. This allows B to compute xyP by adding xP to itself y times.

Note also that x is random but xP provides no information about x (thanks to the so called Discrete Logarithm problem over E'). Therefore, xP is a component of a key based on a random secret chosen by A. Likewise, y is random but yP provides no information about y. Hence, yP is a component of a key based on a random secret known only to B.

Note further that xyP can serve as a session key. Also, the session key could be any known function of xyP. That is, the session key could equal f(xyP), where f is known to both parties and is not required to be secret (i.e., known to the world). One practical requirement on f should be that f(xyP) is hard to compute without knowledge of x or y, and the output is of a satisfactory length from a cryptographic perspective, e.g., around 128 bits or more.

Some of the properties of the IBAKE protocol include:

Immunity from key escrow: Observe that all the steps in the protocol exchange are encrypted using IBE. So clearly the KGF can decrypt all the exchanges. However, the KGF can not compute the session key. This is because of the hardness of the elliptic curve Diffie-Hellman problem. In other words, given xP and yP, it is computationally hard to compute xyP.

Mutually Authenticated Key Agreement: Observe that all the steps in the protocol exchange are encrypted using IBE. In particular, only B can decrypt the contents of the message sent by A in the first and third steps, and similarly only A can decrypt the contents of the message sent by B in the second step. Moreover, at the end of the second step, A can verify B's authenticity since xP could have been sent in the second step only after decryption of the contents in the first step by B. Similarly, at the end of the third step, B can verify A's authenticity since yP could have been sent back in the third step only after correctly decrypting the contents of the second step and this is possible only by A. Finally, both A and B can agree on the same session key. In other words, the protocol is a mutually authenticated key agreement protocol based on IBE. While the above description provides the motivation for the security of the protocol, a cryptographic proof of security can be found in, for example, V. Cakulev and G. Sundaram. MIKEY-IBAKE: Identity-Based Authenticated Key Exchange (IBAKE) Mode of Key Distribution in Multimedia Internet KEYing (MIKEY). IETF Network Working Group RFC 6267, June 2011, which is herein incorporated by reference in its entirety. The hardness of the protocol relies on the hardness of the elliptic curve Diffie-Hellman problem, which is influenced by the choice of elliptic curve.

Perfect forward and backwards secrecy: Since x and y are random, xyP is always fresh and unrelated to any past or future sessions between A and B.

No passwords: the IBAKE protocol does not require any offline exchange of passwords or secret keys between A and B. In fact, the method is clearly applicable to any two parties communicating for the first time through any communication network. The only requirement is to ensure that both A and B are aware of each other's public keys, for example, through a directory service.

Returning to the present embodiments, as discussed above, a user $U_i$ wishes to share a piece of information data $D_i$ with M−1 specific users (friends), using OAuth as the means of authorization. All N users are assumed to have a pair of keys (a private and a public key), which correspond to a specific user identity. User $U_i$'s private key $K_{PRi}$ is kept secret by $U_i$, while the corresponding public key $K_{PUBi}$ is made available to all N users. It is also assumed that for storage of information shared by $U_i$, SNO allocates resource storage/container $r_i$. Although user authorization operations for accessing resources are handled by OAuth, it is assumed that users may not always trust SNO with regards to how safely the shared information is stored in RS.

Figure 2:
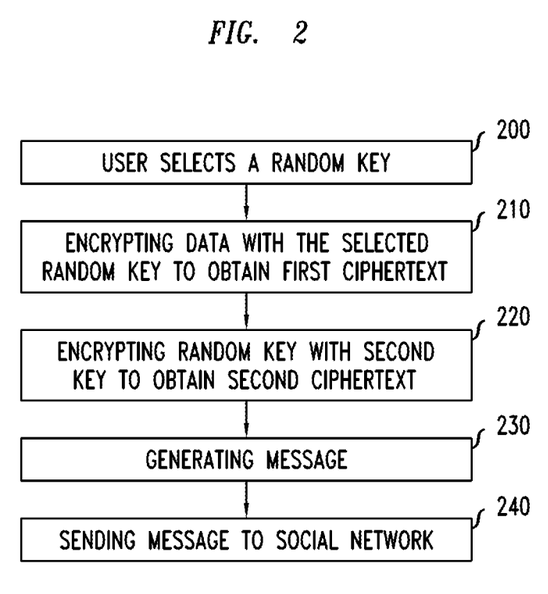
FIG. 2 is a flow chart illustrating a method of using a random key to ensure secure information sharing in a social network, according to embodiments.

In the embodiment shown in FIG. 2, a random key $K_R$ can be selected in step 200 by a user $U_i$ wishing to share data with a set of users of a social network. In step 210, the shared data can be encrypted using the random key $K_R$ and a first ciphertext $C_{D1}$ can be formed from the encrypted data. In other words, $U_1$ selects a random key $K_R$ in step 200 and encrypts $D_1$ using $K_R$ thereby creating ciphertext $C_{D1}=E(K_R, D_1)$ in step 210. This ciphertext can be placed within a message $m_1$ in step 230.

In step 220, random key $K_R$ can be encrypted using a second cryptographic key $K_X$ to form a second ciphertext $C_i$. In step 230, a message including the first ciphertext and the second ciphertext, for example, in a concatenated format, $C_{D1}\|C_i$, can be generated. Finally, in step 240, the generated message can be sent to the social network. It should be noted that the steps of FIG. 2 can be added to or removed, and/or re-ordered.

For example, the generated message of step 230 can be signed by the user using the user's private key $K_{PR1}$ before sending the message to the social network. In addition, in step 240, the message can be sent to RS, where it can be stored in $r_1$. Note that the message is not decrypted before or during storage in $r_1$.

Figure 3:
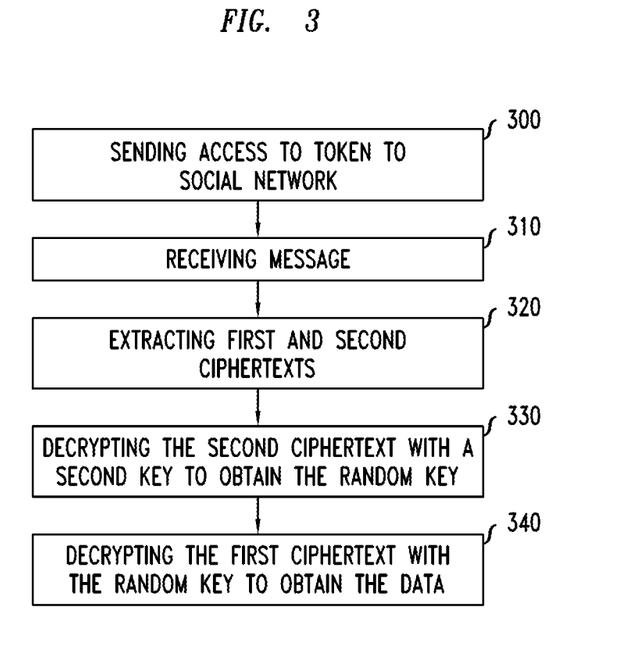
FIG. 3 is a flow chart illustrating a method of using a random key to ensure secure information sharing in a social network, according to embodiments.

In another embodiment shown in FIG. 3, a user $U_i$ (a friend of $U_1$) presents an access token to the social network in step 300. Upon validation of the access token (not shown), each user $U_i$ from the M−1 users obtains $m_1$ from $r_1$ in step 310. In step 320, $U_i$ extracts the corresponding ciphertexts $C_{D1}$, and $C_i$ from the message $m_1$. $U_i$ decrypts $C_i$ using a key corresponding to the second key of step 220 to obtain the random key $K_R$ in step 330 and then uses the obtained random key $K_R$ to decrypt $C_{D1}$ to obtain $D_1$ in step 340. As noted above, the steps of FIG. 3 can be added to or removed, and/or re-ordered. It is also noted that while the flow chart of FIG. 3 illustrates the steps for a single user/friend, the steps described can be used by each user/friend within the group of friends who have access to the message.

For example, users $U_2, \ldots, U_M$ can be notified with regards to the arrival of a new message by $U_1$ using functions provided by SNO. Alternatively, these users may periodically access information stored by $U_1$ by SNO for any updates, again using OAuth. Also, each user $U_i(i\in[2,M])$ can obtain an OAuth access token as per known processes, but such processes can be skipped if user $U_i$ already has such a (valid) access token. Note that $U_i$ may have to renew the access token if the current token has expired. Also, each user $U_i(i\in[2,M])$ can also validate the integrity of the message $m_1$ by using the user's $U_1$ $K_{PUB1}$.

As will be understood by those of skill in the art, not all users of a social network will be on or active with the social network all the time. It is noted that the embodiments described herein do not require users $U_2, \ldots, U_M$ to be online for the purposes of security association establishment; users may retrieve and process the message $m_1$ once they go online.

In various embodiments, the second key of steps 220 and 330 can be different cryptographic keys. For example, in one embodiment, the second key can correspond to the public keys of the users (friends) that are supposed to receive the message. Therefore, for example, in step 220, the random key is encrypted as many times as the number of users that are authorized to obtain the shared message. For example, $U_1$ generates M−1 ced ciphertexts $(C_2, \ldots, C_M)$; each ciphertext $C_i$ is generated by encrypting the randomly generated $K_R$ key (i.e., $K_R$ itself is the input plaintext) with the public key of user $U_i$, such that $C_i=E(K_{PUBi}, K_R)$ where $i\in[2,M]$. Further, the set of ciphertexts $(C_2, \ldots, C_M)$ along with the corresponding identities of the friend users are included in $m_1$ in addition to $C_{D1}$ in step 230. With this, the high level structure of message $m_1$ could be as follows:

$$m_1=C_{D1}\|\{U_2,C_2\}\|\ldots\|\{U_M,C_M\}. \tag{2}$$

Similarly, in step 320, $U_i$ extracts the corresponding tuple $U_i$–$C_i$ from $m_1$ and in step 330 decrypts the ciphertext $C_i$ using the corresponding private key $K_{PRi}$. With this, $U_i$ can obtain $K_R$ and using $K_R$ in step 340 user $U_i$ can decrypt $C_{D1}$ thereby obtaining $D_1$.

Note also that with this technique, only the authorized users can decrypt $C_D$ because only they have the private key corresponding to the public key used by the $U_1$ to encrypt the $K_R$, whereas the authorization is done using OAuth. However, this technique allows SNO to also obtain D, because the security credentials for the users (e.g., private key corresponding to the user's public key) could have been provisioned by SNO.

An alternative more efficient IBE-based embodiment that follows similar logic is the following: instead of encrypting the randomly generated $K_R$ key with each friend's public key, $U_1$ may encrypt $K_R$ (which is used for encrypting $D_1$) with a single "group public key/identity". In order to be able to decrypt the IBE-encrypted $K_R$, each of $U_1$'s friends needs to securely obtain the corresponding IBE group private key from a KGF (potentially owned by SNO). Hence, as soon as the encrypted content is posted on $r_1$, each notified friend contacts the appropriate KGF, obtains the IBE group private key (not shown), decrypts the $K_R$ in step 330 and decrypts the content in step 340. Note that the advantage of this approach is that only one encryption of $K_R$ is needed; any friend that obtains the appropriate IBE private group key will be able to decrypt $K_R$ and further $D_1$. This embodiment also allows SNO to obtain D, in the case where the security credentials for the user group (e.g., private group key corresponding to the user's public group key) have been provisioned by SNO.

In yet another embodiment, the random key $K_R$ can be encrypted with a shared commonly derived key. In this embodiment SNO is not able to decrypt the information stored in RS in scenarios where SNO is the entity that provisions the users' private keys.

One way to derive this common key is using IBAKE. As discussed above each user has been provisioned with an IBE private/public key pair and is able to perform ECC (Elliptic Curve Cryptography) operations. More specifically, each user $U_i$ generates a random number $a_i$ which is kept secret, i.e., it is known only to $U_i$. Furthermore, $U_i$ publishes the following information:

The value of $Z_i=a_iP$, where P is a commonly agreed point on an elliptic curve E. Note that P, E, as well as other public parameters are freely available.

The value of $X_i=a_i(a_{i+1}P-a_{i-1}P)$. Moreover, $U_1$ encrypts $K_R$ using second key $K_x=K1$ in step 220; and key $K_1$ is derived as per the following formula:

$$K_1=Ma_1(Z_M)+(M-1)X_1+(M-2)X_2+\ldots+X_{M-1}. \tag{3}$$

By encrypting $K_R$, $U_1$ creates ciphertext $C_1$ in step 220. Users $U_2, \ldots, U_M$ can decrypt $C_1$ by using a key that is calculated locally by each of them in step 330. Specifically, each user $U_i$ from the M−1 users calculates the same key $K_i$ as follows:

$$K_i=Ma_i(Z_{i-1})+(M-1)X_i+(M-2)X_{i+1}+\ldots+I_{i-2}.$$

It is noted that the explanation above is based on calculations on an elliptic curve as a finite group, and as one of ordinary skill in the art would recognize, the same calculations could be performed on any finite group where the group Diffie-Hellman problem is difficult to solve. In some embodiments, the finite group comprises points on a non-supersingular elliptic curve, and the key components are derived from a fixed known point on the curve, and the secret random numbers are random integers.

Figure 4:
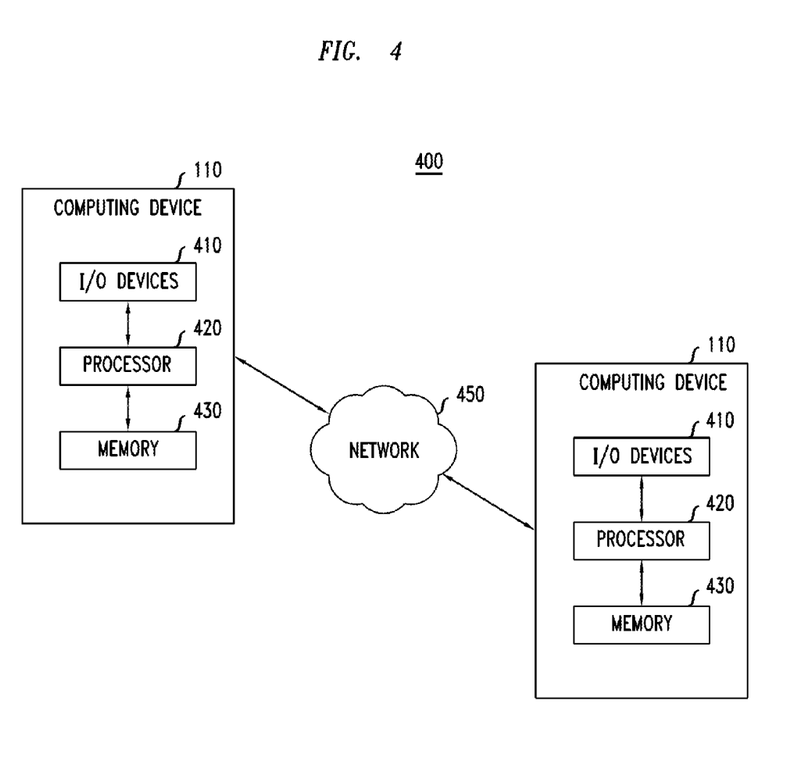
FIG. 4 is a generalized hardware architecture for implementing secure information sharing in a social network, according to embodiments.

Finally, FIG. 4 illustrates a generalized hardware architecture 400 of a network environment and communication devices in the form of computing devices suitable for implementing a secure key management protocol between at least two entities according to the present invention. While FIG. 4 shows only two entities, it is to be understood that other entities can have the same configuration. Thus, in terms of the secure key management protocols described above, the two entities may be users 110. However, KGFs, functional elements, additional users (parties) and additional servers may be implemented with the same architecture as shown in a computing device of FIG. 4. Thus, for the sake of simplicity, all the computing devices (communication devices) that may participate in the protocols of the invention are not shown in FIG. 4.

As shown, computing devices designated 110 are coupled via a network 450. The network 450 may be any network across which the devices are able to communicate, for example, as in the embodiments described above, the network 450 could include a publicly-accessible wide area communication network such as a cellular communication network operated by a network operator (e.g., Verizon, AT&T, Sprint). However, the invention is not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. However, one or more of the devices could be servers. Thus, it is to be understood that the communication protocol of the present invention is not limited to the case where the computing systems are client and server, respectively, but instead is applicable to any computing devices comprising the two network elements.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 4 generally illustrates an exemplary architecture for each computer system communicating over the network. As shown, devices 110 comprises I/O devices 410, processors 420, and memories 430. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. As used herein, the term "and/or" with respect to a listing of items such as, for example, A and/or B, means A alone, B alone, or A and B. Those skilled in the art will recognize that these and other variations are possible within the spirit and scope as defined in the following claims and their equivalents.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for secure information sharing in a social network, comprising:
   receiving authorization to obtain at least one message including data $D_1$, wherein the authorization is provided by a resource owner of the at least one message for a given user of the social network;
   receiving the at least one message;
   extracting a first ciphertext $C_i$ and a second ciphertext $C_{D1}$ from the at least one message;
   decrypting the first ciphertext $C_i$ with a first key to obtain a random key $K_R$; and
   decrypting the second ciphertext $C_{D1}$ using the random key $K_R$ to obtain the data $D_1$;
   wherein the first key is associated with an identity of the given user; and
   wherein the receiving authorization, receiving the at least one message, extracting, decrypting the first ciphertext and decrypting the second ciphertext are performed by at least one processing device comprising a processor coupled to a memory.

2. The method of claim 1, wherein the first key is a private key of the given user corresponding to a known public key of the given user.

3. The method of claim 2, wherein the at least one message comprises the following structure: $m_1 = C_{D1} \| \{U_2, C_2\} \| \ldots \| \{U_M, C_M\}$, wherein $C_{D1}$ is the second ciphertext formed by encrypting $D_1$ using $K_R$, the resource owner is a first one of M users, and $\{U_2, C_2\} \| \ldots \| \{U_M, C_M\}$ is formed by concatenating first ciphertext $C_i$ corresponding to each of a remaining M−1 users, where each first ciphertext is the random key $K_R$ encrypted with a public key of the corresponding user.

4. The method of claim 1, wherein the first key is a group public key.

5. The method of claim 4, further comprising:
   securely obtaining the group public key from a key generation function entity.

6. The method of claim 1, wherein the first key is a shared commonly derived key.

7. The method of claim 6, wherein the resource owner is a first one of M users, and the shared commonly derived key is based on a secret random number generated by the resource owner and key components from one or more other users, and the key derivation is based on operations on a finite group, wherein the one or more other users are users that are authorized to derive the shared common key.

8. The method of claim 7, wherein the finite group comprises points on a non-supersingular elliptic curve, and the key components are derived from a fixed known point on the curve, and the secret random numbers are random integers.

9. The method of claim 1, further comprising:
   receiving a notification that at least one message including data intended to be shared with the given user of the social network is present at the social network.

10. The method of claim 1, further comprising:
    sending an update request as to whether there is at least one message including data intended to be shared with the given user of the social network present at the social network; and
    receiving confirmation that there is at least one message including data intended to be shared with the given user of the social network present at the social network.

11. The method of claim 1, wherein authorization is based on an OAuth protocol.

12. The method of claim 1, further comprising:
    presenting an access token to the social network; and
    receiving validation of the access token prior to receiving the at least one message.

13. The method of claim 1, further comprising:
    validating the integrity of the at least one message by using a known public key of the resource owner.

14. An apparatus comprising:
    a memory; and
    at least one processor coupled to the memory and configured to:
    receive authorization to obtain at least one message including data $D_1$, wherein the authorization is provided by a resource owner of the at least one message for a given user of the social network;
    receive the at least one message;
    extract a first ciphertext $C_i$ and a second ciphertext $C_{D1}$ from the at least one message;
    decrypt the first ciphertext $C_i$ with a first key to obtain a random key $K_R$; and
    decrypt the second ciphertext $C_{D1}$ using the random key $K_R$ to obtain the data $D_1$;
    wherein the first key is associated with an identity of the given user.

15. A, method for secure information sharing in a social network, comprising:
    selecting a random key $K_R$;
    encrypting data $D_1$ intended to be shared with a set of users of the social network with the random key $K_R$ to create a first ciphertext $C_{D1}$;
    encrypting the random key $K_R$ with a second key to create a second ciphertext $C_i$;
    creating a message including both the first and second ciphertexts; and
    sending the created message to a storage location of the social network;

wherein the second key is associated with an identity of at least one of the users in the set of users;

wherein the selecting, encrypting data, encrypting the random key, creating and sending are performed by at least one processing device comprising a processor coupled to a memory.

16. The method of claim 15, wherein the second key is a public key of a given user of the set of users, such that $C_i$ equals the encryption of the random key $K_R$ with the public key of the given user.

17. The method of claim 15, wherein the second key is a group public key securely obtainable from a key generation function entity.

18. The method of claim 15, wherein the second key is a shared commonly derived key based on a secret random number and a commonly agreed point on an elliptic curve.

19. An apparatus comprising:

a memory; and at least one processor coupled to the memory and configured to:

select a random key $K_R$;

encrypt data $D_1$ intended to be shared with a set of users of the social network with the random key $K_R$ to create a first ciphertext $C_{D1}$;

encrypt the random key $K_R$ with a second key to create a second ciphertext $C_i$;

create a message including both the first and second ciphertexts; and send the created message to a storage location of the social network;

wherein the second key is associated with an identity of at least one of the users in the set of users.

20. A system for secure information sharing in social networks, comprising:

a plurality of social network users; and a social network host;

a given one of the plurality of social network users being configured to:

encrypt data to be shared between a set of one or more other social network users using a random key;

generate a set of ciphertexts, each of the ciphertexts being generated by encrypting the random key with a second key corresponding to at least one of the set of other social network users;

form a message including the encrypted data and the generated set of ciphertexts; and send the formed message to the social network host;

the social network host being configured to:

receive and store the formed message; and send the formed message to at least one of the set of other social network users; and each of the set of other social network users being configured to:

receive the formed message;

extract at least one ciphertext from the formed message;

decrypt the at least one ciphertext using a first key corresponding to the second key to obtain the random key; and decrypt data from the formed message using the decrypted random key;

wherein the first key and the second key are associated with an identity of at least one of the set of other social network users.

* * * * *

UNITED STATES PATENT AND TRADEMARK OFFICE
CERTIFICATE OF CORRECTION

PATENT NO. : 8,769,259 B2  
APPLICATION NO. : 13/345241  
DATED : July 1, 2014  
INVENTOR(S) : Ioannis Broustis et al.

Page 1 of 1

It is certified that error appears in the above-identified patent and that said Letters Patent is hereby corrected as shown below:

In the specification:

Column 10, line 67, after "…+" please change "$I_{i-2}$" to --$X_{i-2}$--

In the claims:

Claim 3, column 13, line 62, after "concatenating first" please change "ciphertext" to --ciphertexts--

Claim 15, column 14, line 56, please change "A, method" to --A method--

Signed and Sealed this  
Sixteenth Day of September, 2014

Michelle K. Lee  
*Deputy Director of the United States Patent and Trademark Office*